United States Patent [19]

Konishi

[11] Patent Number: 4,940,273
[45] Date of Patent: Jul. 10, 1990

[54] AUXILIARY VISOR

[75] Inventor: Masaaki Konishi, Yokohama City, Japan

[73] Assignee: Nissan Motor Co., Ltd., Yokohama City, Japan

[21] Appl. No.: 330,518

[22] Filed: Mar. 30, 1989

[30] Foreign Application Priority Data

Mar. 31, 1988 [JP] Japan .................................. 63-81089

[51] Int. Cl.⁵ ............................................. B60J 3/00
[52] U.S. Cl. ..................................... 296/97.6; 296/97.9
[58] Field of Search ...................... 296/97.6, 97.1, 97.9

[56] References Cited

U.S. PATENT DOCUMENTS

| 2,485,440 | 10/1949 | Freidman | 296/97.6 |
| 2,620,222 | 12/1952 | Beanchamp | 296/97.6 |
| 2,970,864 | 2/1961 | McCann, Jr. | 296/97.6 |
| 4,195,876 | 4/1980 | Timperio | 296/97.6 |
| 4,275,917 | 6/1981 | Marcus | 296/97.6 |
| 4,363,512 | 12/1982 | Marcus | 296/97.6 |

FOREIGN PATENT DOCUMENTS 57-131321  8/1982  Japan .

Primary Examiner—Robert R. Song
Attorney, Agent, or Firm—Pennie & Edmonds

[57] ABSTRACT

A pair of first and second mounting shafts project outwardly from opposite ends of a shield. The first mounting shaft is supported by a first mounting bracket in such a way as to be axially slidable but prevented from rotation relative to the first mounting bracket. The second mounting shaft is supported by a second mounting bracket in such a way as to be prevented from rotation relative to the second mounting bracket and removable from same through movement in the direction substantially perpendicular to its axis.

5 Claims, 3 Drawing Sheets

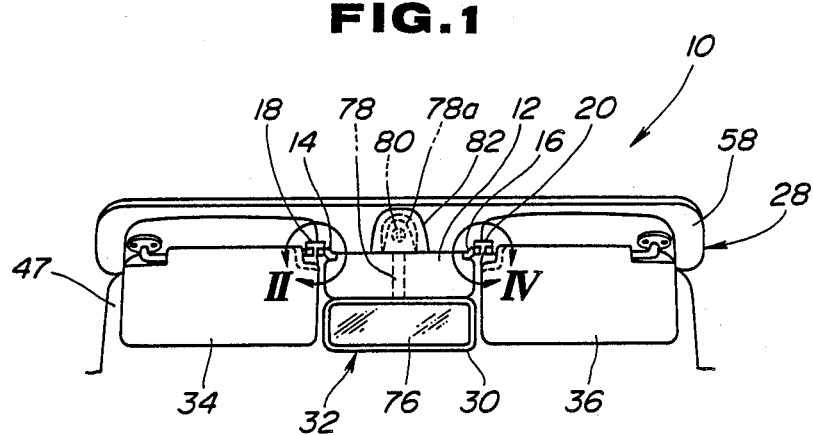
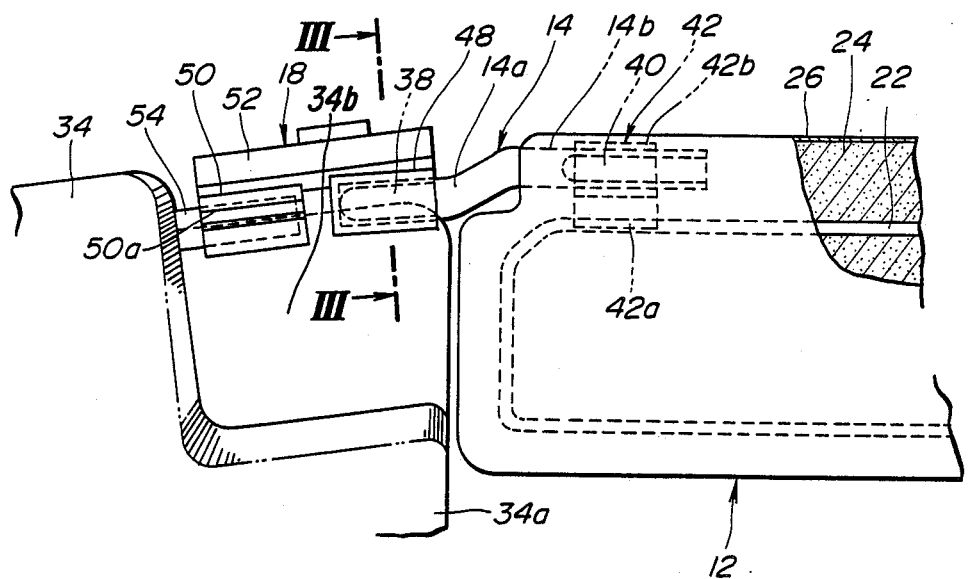

4,940,273

AUXILIARY VISOR

BACKGROUND OF THE INVENTION

1. Field of the Invention

The present invention relates to an auxiliary visor for an automotive vehicle.

2. Description of the Prior Art

It is known to install an auxiliary visor on a rearview mirror placed between standard sun visors as disclosed by Japanese Provisional Utility Model Publication No. 57-131321.

It is also known to slidably install on a vehicle body an auxiliary visor for selectively filling in the gap above and behind a rear view mirror which is not covered by usual sun visors as disclosed by U.S. Pat. No. 4,275,917.

A problem of the auxiliary visor disclosed by the above Japanese Utility Model Publication is that the visor permanently installed on the rearview mirror tends to make a driver or passenger of a vehicle feel depressed, gloomy or uncomfortable though it is effective for shielding the unprotected area between the usual sun visors.

A problem of the auxiliary visor disclosed by the above U.S. Patent is that such a visor cannot be used in case the rearview mirror is installed on a vehicle headlining member by means of a stay, i.e., the visor can be used only when the rearview mirror is of the type installed on a windshield glass.

SUMMARY OF THE INVENTION

In accordance with the present invention, there is provided an auxiliary visor for a vehicle having a ceiling member, a pair of sun visors supported on the ceiling member and a rearview mirror mounted between the sun visors. The auxiliary visor comprises a sheild disposed between the sun visors and having an upper end portion, mounting shaft means rotatably installed on the upper end portion on the shiled and having first and second mounting shaft portions projecting outwardly from opposite end portions of the shield, and first and second mounting brackets installed on the ceiling member and receiving the first and second shaft portions, respectively. The first mounting shaft portion is formed with a pair of diametically opposed flat surfaces while the second mounting shaft portion is partially splined. The first mounting bracket has a sleeve portion supporting the first mounting shaft portion in such a way that the first mounting shaft portion is axially movable but prevented from rotation relative to the first mounting bracket. The second mounting bracket has a clip portion splined correspondingly to the second mounting shaft portion and supporting same in such a way that the second mounting shaft portion is prevented from rotation relative to the clip portion and removable from same through movement in the direction substantially perpendicular to its axis.

The above structure is effective for solving the above noted problems inherent in the prior art visors.

It is accordingly an object of the present invention to provide an auxiliary visor which does not make a driver or passenger of a vehicle feel depressed, gloomy or uncomfortable without deteriorating its function.

It is a further object of the present invention to provide an auxiliary visor of the above described character which can be used not only in case a rear view mirror is installed on a windshield glass but in case a rearview mirror is installed on a ceiling member.

BRIEF DESCRIPTION OF THE DRAWINGS

FIG. 1 is an elevational view of an auxiliary visor according to an embodiment of the present invention;

FIG. 2 is an enlarged view of a portion "II" of FIG. 1;

DESCRIPTION OF THE PREFERRED EMBODIMENT

Figure 3:
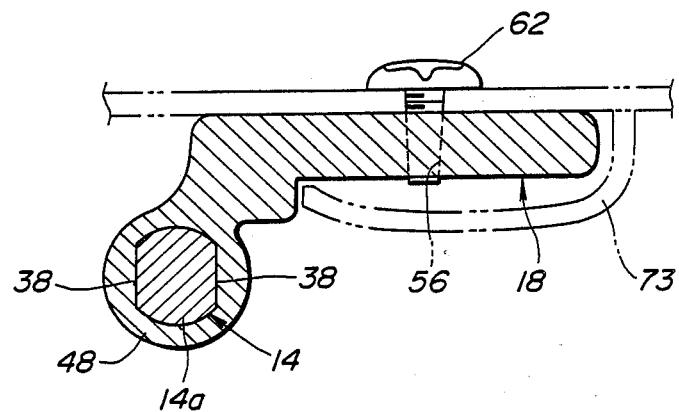
FIG. 3 is a sectional view taken along the line III—III of FIG. 2.
Figure 4:
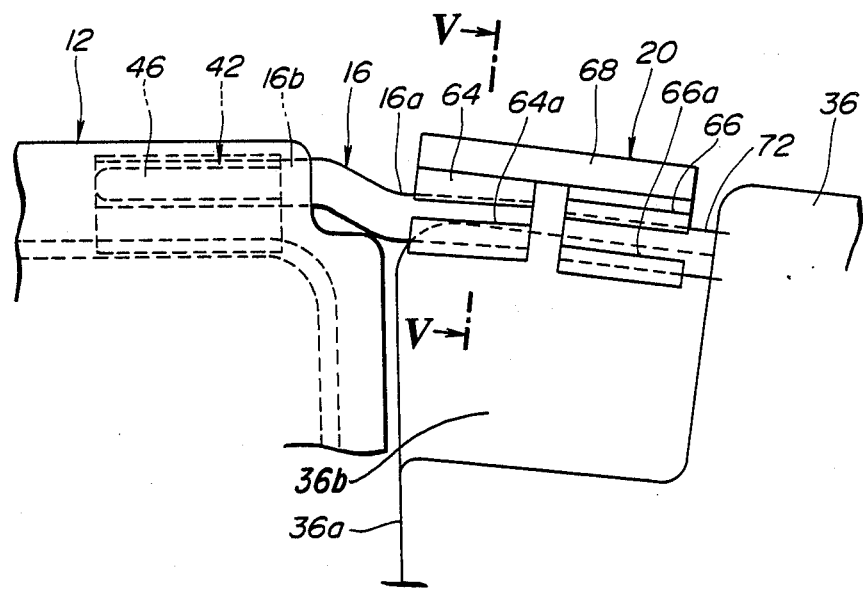
FIG. 4 is an enlarged view of a portion "IV" of FIG. 1.
Figure 5:
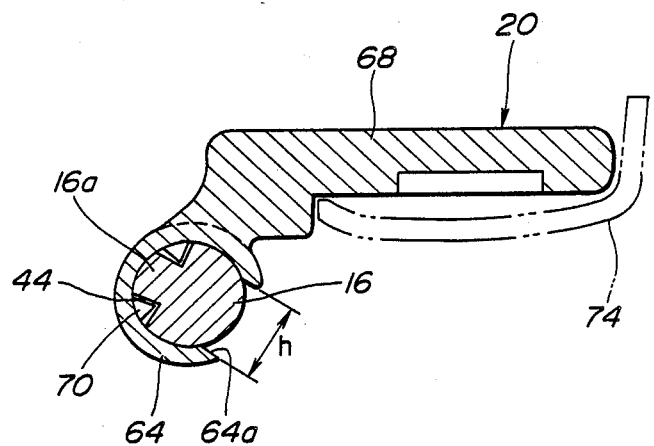
FIG. 5 is a sectional view taken along the line IV—IV of FIG. 4.

Referring to FIGS. 1–5, an auxiliary visor 10 according to an embodiment of the present invention includes a shield 12, a pair of first and second mounting shafts 14, 16 and a pair of first and second mounting brackets 18, 20.

The shield 12 is rectangular in shape and elongated laterally of the vehicle. The shield 12 includes a looped wire 22, a cushion member 24 in which the wire 22 is embedded and a covering member 26 formed of polyvinyl chrolide or the like material and covering the outer surface of the cushion member 24. The shield 12 is arranged above a main body section 30 of a rearview mirror 32 and between standard or usual sun visors 34, 36.

The first and second mounting shafts 14, 16 are pivotally or rotatably installed on an upper end portion 12a of the shield 12. More specifically, the first mounting shaft 14 has a portion 14a projecting outwardly of the shield 12 and a portion 14b received in the same. The shaft portion 14a is formed with a pair of diametrically opposed flat surfaces 38, 38. Similarly, the shaft portion 14b is formed with a pair of diametrically opposed flat surfaces 40, 40.

A spring member 42 formed from a strip of resilient sheet is embedded in the shield 12 and has opposite ends 42a secured to the wire 22. The spring member 42 also has a resiliently expansible portion 42b urged for contact with the flat surfaces 40, 40 of the first mounting shaft 14 when the shield 12 is in a predetermined position, i.e., in a position where the shield 12 fills in the gap between the sun visors 34, 36. By this, the shield 12 is rotatable on the mounting shaft 14 only when subjected to a driving force exceeding a predetermined value, i.e., when subjected to a driving force larger than the force with which the mounting shaft 14 is held in a rotated position by means of the spring member 42.

The second mounting shaft 16 has a portion 16a projecting outwardly of the shield 12 and a portion 16b received in same. The shaft portion 16a is partially splined 44. The shaft portion 16b is formed with a pair of diameterially opposed flat surfaces 46, 46 and received in another spring member 42 embedded in the shield 12 and constructed similarly to the above mentioned spring member 42.

The first and second mounting brackets 18, 20 are formed of a soft synthetic resinous material by injection molding and fixedly attached to the vehicle ceiling member 28 above a windshield 47.

The first mounting bracket 18 includes a sleeve portion 48, a part-cylindrical clip portion 50 and a base portion 52. The sleeve portion 48 has an opening of a cross section substantially the same as that of the the portion 14a of the first mounting shaft 14 and receives or supports the same in such a way that the shaft portion 14a is axially movable but prevented from rotation relative to the sleeve portion 48. The clip portion 50 is formed with a slit or cut 50a throughout the axial length and receives or supports a projection 54 projecting from the inboard end 34a of the adjacent standard visor 34 in such a way that the projection 54 is removable from the clip portion 50 through movement in the direction substantially perpendicular to its axis. The area 34b of the adjacent visor 34 is recessed downward so as to block the light behind and provide clearance for the mounting bracket 18. The base portion 52 is formed with a hole 56 and adapted to be secured to an overhead ganish molding 58 serving as the ceiling member 28 with a screw 62 which is screwed in place from the upper or outboad side of the overhead garnish molding 58.

The second mounting bracket 20 includes a first clip portion 64, a second clip portion 66 and a base portion 68. The first clip portion 64 is formed with a slit or cut 64a throughout the length thereof. The first clip portion 64 is splined 70 correspondingly to the splined portion 16a of the second mounting shaft 16 and receives or supports same in such a way that the portion 16a of the second mounting shaft 16 prevented from rotation relative to the clip portion 64 and removable from same through movement in the direction substantially perpendicular to its axis. The second clip portion 66 receives or supports a projection 72 projecting from the inboad end 36a of the adjacent standard sun visor 36 in such a way that the projection 72 is removable from the clip portion 66 through movement in the direction substantially perpendicular to its axis. The area 36b is recessed downward to provide clearance for and block the light from behind mounting bracket 20, similar to area 34b of the visor 34. The base portion 68 is screwed to the overhead garnish molding 58 similarly to the base portion 52 of the first mounting bracket 18.

When the projections 54, 72 and the second mounting shaft portion 16a are designed to be of the same diameter of, for example, 7.5 mm, the clip portions 50, 64, 66 are designed to be of the same inner diameter of 8.75 mm and the cuts 50a, 64a, 66a are disigned to be of the same width "h" of 6.8 mm so that the force for engagement and disengagement of the projections 54, 72 and the shaft portion 16a with and from the corresponding clip portions 50, 66, 64 is not so large. Each base portions 52, 68 are covered by covering members 73.

The rearview mirror 32 includes the main body 30 with a mirror 76, a stay 78 having an upper end 78a secured to the headlining member 28 with a screw 80 and a lower end supporting the main body 30 for thereby supporting the main body 30 upon the ceiling member 28 and a covering member 82 removably installed on the overhead garnish molding 58 in such a way as to cover the upper end portion 78a of the stay 78.

In removal of the rearview mirror 32, the sheild 12 is first rotated or turned in such a way that the portion 16a of the second mounting shaft 16 is pulled toward the driver or passenger. By this, the clip portion 64 is deformed resiliently allowing the cut 64a to become wider, whereby to make it possible for the portion 16a of the second mounting shaft 16 to be removed from the clip portion 64. The shield 12 is then pulled in the right hand direction so that the portion 14a of the first mounting shaft 14 is moved axially of the sleeve portion 48 of the first mounting bracket 18 and removed from same. Removal and installation of the cover member 82 thus can be performed with ease.

With the foregoing structure, the auxiliary visor 10 is rotatable into the position where it lies along the ceiling member 28, whereby a signal lamp can be seen through a gap between the standard sun visors 34, 36 and above the rearview mirror 32. Accordingly, it becomes possible to prevent the auxiliary visor 10 from making the driver or passenger feel depressed, gloomy or uncomfortable. When the auxiliary visor 10 is rotated into a position where it fills in the gap above the rear view mirror 32 which is not covered by the standard sun visors 34, 36, it can effectively shield of eyes of the driver from direct sunlight or glare. Further, the auxiliary visor 10 is removable from the first and second mounting brackets 18, 20, thus making it possible to perform installation and removal of the rearview mirror 32 can be done with ease.

In the foregoing, it will be understood that the first and second mounting shafts 14, 16 are not necessarily separate members but can be a single unit.

What is claimed is:

1. An auxiliary visor for a vehicle having a ceiling member, a pair of sun visors supported on the ceiling member and a rearview mirror mounted between the sun visors, said auxiliary visor comprising:
   a shield disposed between said sun visors and having an upper end portion;
   mounting shaft means rotatably installed on said upper end portion of said shield and having first and second mounting shaft portions projecting outwardly from opposite end portions of said shield; and
   first and second mounting brackets installed on said ceiling member and supporting said first and second shaft portions, respectively;
   said first mounting shaft portion being formed with a pair of diametrically opposed flat surfaces and said second mounting shaft portion being partially splined;
   said first mounting bracket having a sleeve portion receiving said first mounting shaft portion in such a way that said first mounting portion is axially movable but prevented from rotation relative to said first mounting bracket;
   said second mounting bracket having a clip portion splined correspondingly to said second mounting shaft portion and supporting same in such a way that said second mounting shaft portion is prevented from rotation relative to said clip portion and removable from same through movement in the direction substantially perpendicular to its axis.

2. The auxiliary visor according to claim 1 wherein said rearview mirror includes a stay having an upper end attached to said ceiling member and a main body secured to a lower end of said stay, and said shield is disposed between said ceiling member and said main body of said rearview mirror.

3. The auxiliary visor according to claim 2 wherein said mounting bracket means comprises first and second mounting shafts including said first and second mounting shaft portions, respectively, said first and second shafts further including third and fourth shaft portions received by said opposite end portions of said shield, respectively, said third and fourth shaft portions being formed with a pair of diametrically opposite flat surfaces, respectively, said shield having spring means for holding said first and second mounting shafts in such a way that said shield is rotatable relative to said first and second mounting shafts only when subjected to a driving force larger than a predetermined value.

4. The auxiliary visor according to claim 3 wherein said spring means comprises a pair of spring members embedded in said shield, said spring members having resiliently expansible portions urged for contact with said flat surfaces of said third and fourth mounting shaft portions when said shield is in a predetermined position.

5. The auxiliary visor according to claim 4 wherein said sun visors have projections projecting from inboard ends thereof, said first and second mounting brackets further including clip portions supporting said projections in such a way that said projections are removable from said clip means through movement in the direction substantially perpendicular to its axes.

* * * * *